United States Patent
Ranmuthu et al.

(10) Patent No.: US 12,388,367 B2
(45) Date of Patent: Aug. 12, 2025

(54) REVERSE RECOVERY PROTECTION IN A SWITCHING VOLTAGE CONVERTER

(71) Applicant: TEXAS INSTRUMENTS INCORPORATED, Dallas, TX (US)

(72) Inventors: Indumini W Ranmuthu, Plano, TX (US); Michael T Direnzo, Coppell, TX (US)

(73) Assignee: TEXAS INSTRUMENTS INCORPORATED, P.O. Box 655474, M/S 3999 Dallas, TX (US)

( * ) Notice: Subject to any disclaimer, the term of this patent is extended or adjusted under 35 U.S.C. 154(b) by 152 days.

(21) Appl. No.: 17/936,696

(22) Filed: Sep. 29, 2022

(65) Prior Publication Data

US 2024/0113620 A1   Apr. 4, 2024

(51) Int. Cl.
| | |
|---|---|
| H02M 3/158 | (2006.01) |
| H02M 1/00 | (2006.01) |
| H02M 1/08 | (2006.01) |
| H02M 1/32 | (2007.01) |
| H02M 1/34 | (2007.01) |

(52) U.S. Cl.
CPC ......... H02M 3/158 (2013.01); H02M 1/0029 (2021.05); H02M 1/08 (2013.01); H02M 1/32 (2013.01); H02M 1/344 (2021.05)

(58) Field of Classification Search
CPC .... H02M 3/156; H02M 3/158; H02M 3/1588; H02M 1/0029; H02M 1/32; H02M 1/3242; H02M 1/344; H02M 1/08
See application file for complete search history.

(56) References Cited

U.S. PATENT DOCUMENTS

| | | | |
|---|---|---|---|
| 8,305,053 B2 | 11/2012 | Truong | |
| 10,128,755 B2 | 11/2018 | Paul | |
| 2014/0159687 A1 | 6/2014 | Lee | |
| 2016/0277008 A1 | 9/2016 | Green | |
| 2017/0012618 A1 | 1/2017 | Krishna | |
| 2018/0342944 A1* | 11/2018 | Chiereghin | ........... H02M 3/156 |

OTHER PUBLICATIONS

International Search Report mailed on Jan. 26, 2024, PCT Application No. PCT/US2023/034147 filed Sep. 29, 2023, 4 pages.
Written Opinion mailed on Jan. 26, 2024, PCT Application No. PCT/US2023/034147 filed Sep. 29, 2023, 4 pages.

* cited by examiner

*Primary Examiner* — Gary L Laxton
(74) *Attorney, Agent, or Firm* — Charles F. Koch; Frank D. Cimino

(57) ABSTRACT

A voltage regulator control circuit includes a transistor input controller. The transistor input controller forces a slew control signal on its slew control output to a state responsive to a change in a load condition and forces an ON signal to a state on its first transistor control output. A first transistor has a first control input and first and second current terminals. A second transistor couples to the first transistor. A driver has a slew control input, a driver input, and a driver output. The driver input couples to the first transistor control output. The driver output couples to the first control input. Responsive to a first logic state of the slew control signal and a first state of the ON signal, the driver provides a higher current to the first control input, and responsive to a second state of the slew control signal and a first state of the ON signal, the driver provides a lower current to the first control input.

20 Claims, 9 Drawing Sheets

REVERSE RECOVERY PROTECTION IN A SWITCHING VOLTAGE CONVERTER

BACKGROUND

A direct current (DC)-to-DC voltage converter converts an input DC voltage (VIN) to an output DC voltage (VOUT). Depending on the type of voltage converter, VOUT may be smaller or larger than VIN. One type of DC-to-DC voltage converter is a switching converting. Various types of switching converters are available. In one example, a switching converter includes a first transistor (sometimes referred to as a high side (HS) transistor) coupled to a second transistor (sometimes referred to as a low side (LS) transistor between VIN and ground. The connection between the transistors is referred to as the switch node (SW). Responsive to the HS transistor being ON, the SW voltage (Vsw) is pulled upward to approximately VIN. Responsive to the LS transistor being ON, the SW voltage (Vsw) is pulled downward to approximately ground. As a control circuit reciprocally turns ON and OFF the HS and LS transistors, a square wave voltage waveform on SW is generated. An inductor may be coupled to SW. Responsive to the HS transistor being ON, the current through the inductor increases approximately linearly. Responsive to the LS transistor being ON, the current through the inductor decreases approximately linearly.

SUMMARY

In one example, a voltage regulator control circuit includes a transistor input controller. The transistor input controller forces a slew control signal on its slew control output to a state responsive to a change in a load condition and forces an ON signal to a state on its first transistor control output. A first transistor has a first control input and first and second current terminals. A second transistor couples to the first transistor. A driver has a slew control input, a driver input, and a driver output. The driver input couples to the first transistor control output. The driver output couples to the first control input. Responsive to an a first of the slew control signal and a first state of the ON signal, the driver provides a higher current to the first control input, and responsive to a second state of the slew control signal and a first state of the ON signal, the driver provides a lower current to the first control input.

DETAILED DESCRIPTION

Figure 1:
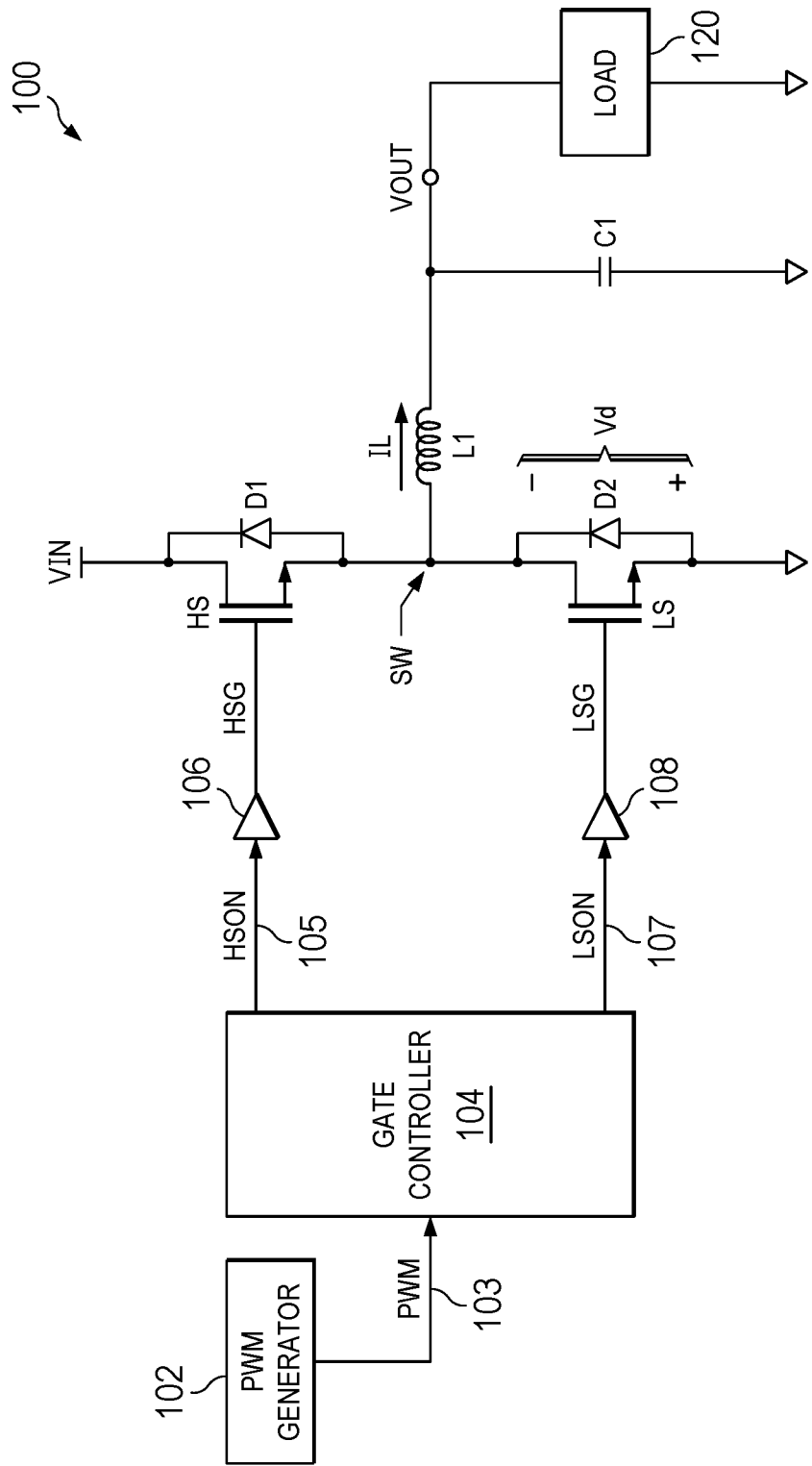
FIG. 1 is a schematic of a voltage converter, in an example embodiment.

The same reference numbers or other reference designators are used in the drawings to designate the same or similar (either by function and/or structure) features.

FIG. 1 is a schematic of a voltage converter 100, in an example embodiment. In this example, the voltage converter 100 includes a pulse width modulator (PWM) generator 102, a gate controller 104, drivers 106 and 108, an HS transistor, an LS transistor, an inductor L1, and an output capacitor C1. The HS and LS transistors in this example are n-channel field effect transistors (NFETs) but can be other types of transistors in other examples. Diode D1 represents the parasitic body diode of the HS transistor. Diode D2 represents the body diode of the LS transistor. The input voltage VIN is provided to the drain of the HS transistor. The voltage across the capacitor C1 is the output voltage VOUT, which may be provided to a load 120.

The PWM generator 102 generates a PWM signal 103. The PWM generator 102 provides the PWM signal 103 to the gate controller 104. In one example, a logic high level of the PWM signal 103 indicates that the HS transistor is to be turned ON, and a logic low level indicates that the LS transistor is to be turned ON. The gate controller 104 receives the PWM signal 103 and generates gate control signals HSON 105 for the HS transistor and LSON 107 for the LS transistor. The gate controller 104 may implement a small amount of idle time between causing one transistor to be turned OFF and before causing the other transistor to be turned ON.

The signals HSON 105 and LSON 107 are provided to their respective drivers 106 and 108, as shown. The drivers 106 and 108 produce voltages (HSG from driver 106 and LSG from driver 108) and currents of sufficient levels to turn ON and OFF the respective HS and LS transistors in accordance with the logic levels of HSON 105 and LSON 107. The source of the HS transistor is coupled to the drain of the LS transistor at the switch node SW. One terminal of inductor L1 is coupled to SW. The current through the inductor L1 is labeled IL. Capacitor C1 is coupled between the other terminal of inductor L1 and ground.

Figure 2:
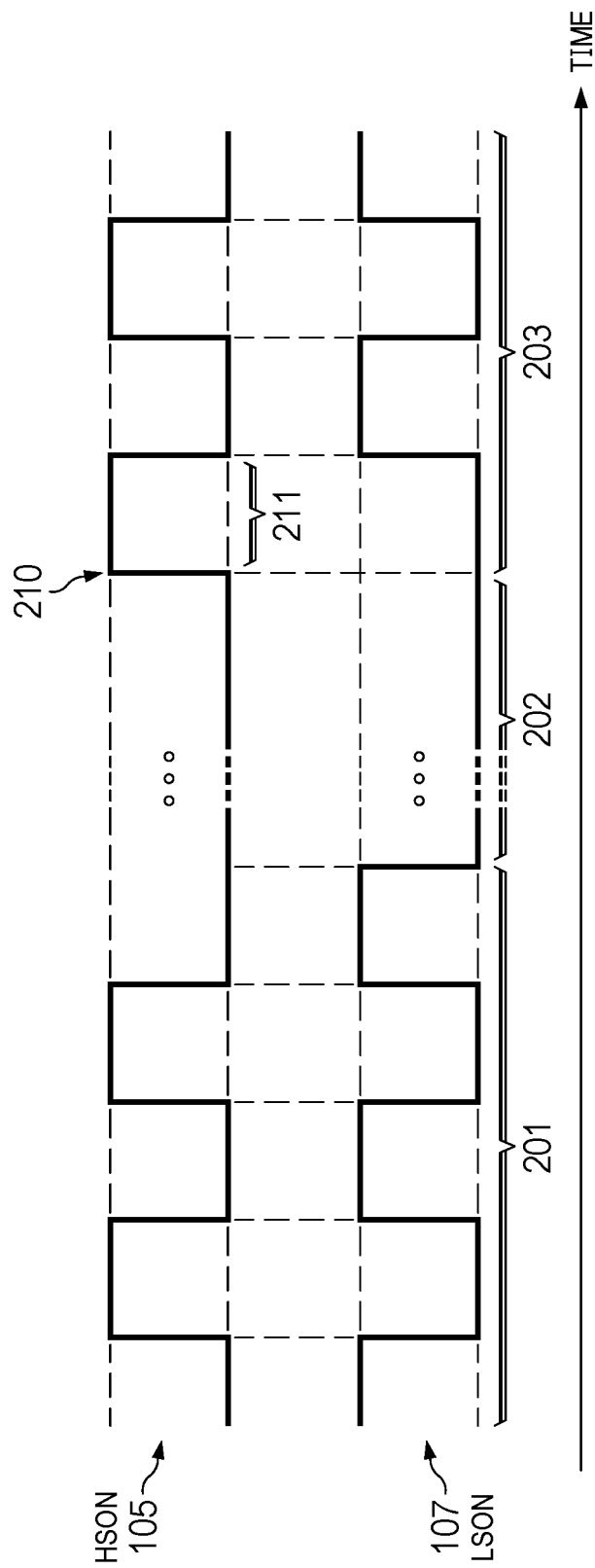
FIG. 2 are waveforms of control signals for controlling transistors within the voltage converter, in an example.

FIG. 2 is an example waveform of signals HSON 105 and LSON 107. A high logic level of signal HSON causes driver 106 to turn ON the HS transistor, and a logic low level of HSON causes driver 106 to turn OFF the HS transistor. Similarly, a high logic level of signal LSON causes driver 106 to turn ON the LS transistor, and a logic low level of LSON causes driver 106 to turn OFF the LS transistor. Because both transistors should not be ON simultaneously, LSON is generally the logical inverse of HSON. The small idle time (not shown in FIG. 2) between a falling edge of HSON before the subsequent rising edge of LSON and between a falling edge of LSON before the subsequent rising edge of HSON ensures that both transistors are not ON at the same time.

A feedback signal (not shown) is used by the voltage converter 100 to produce a regulated output voltage VOUT for a range of load conditions. For example, load 120 may have a normal operating mode (higher current draw from the converter 100) and a sleep state (lower current draw from the converter 100). Reference numerals 201 and 203 represent the higher load condition (e.g., normal operating condition for the load 120). Reference numeral 202 represents a rapid load reduction condition in which the load current rapidly changes from a relatively high level to a relatively low level very quickly. In this example, the switching cycles of the HS and LS transistors ceases during the rapid load reduction condition implemented during 202.

Figure 3:
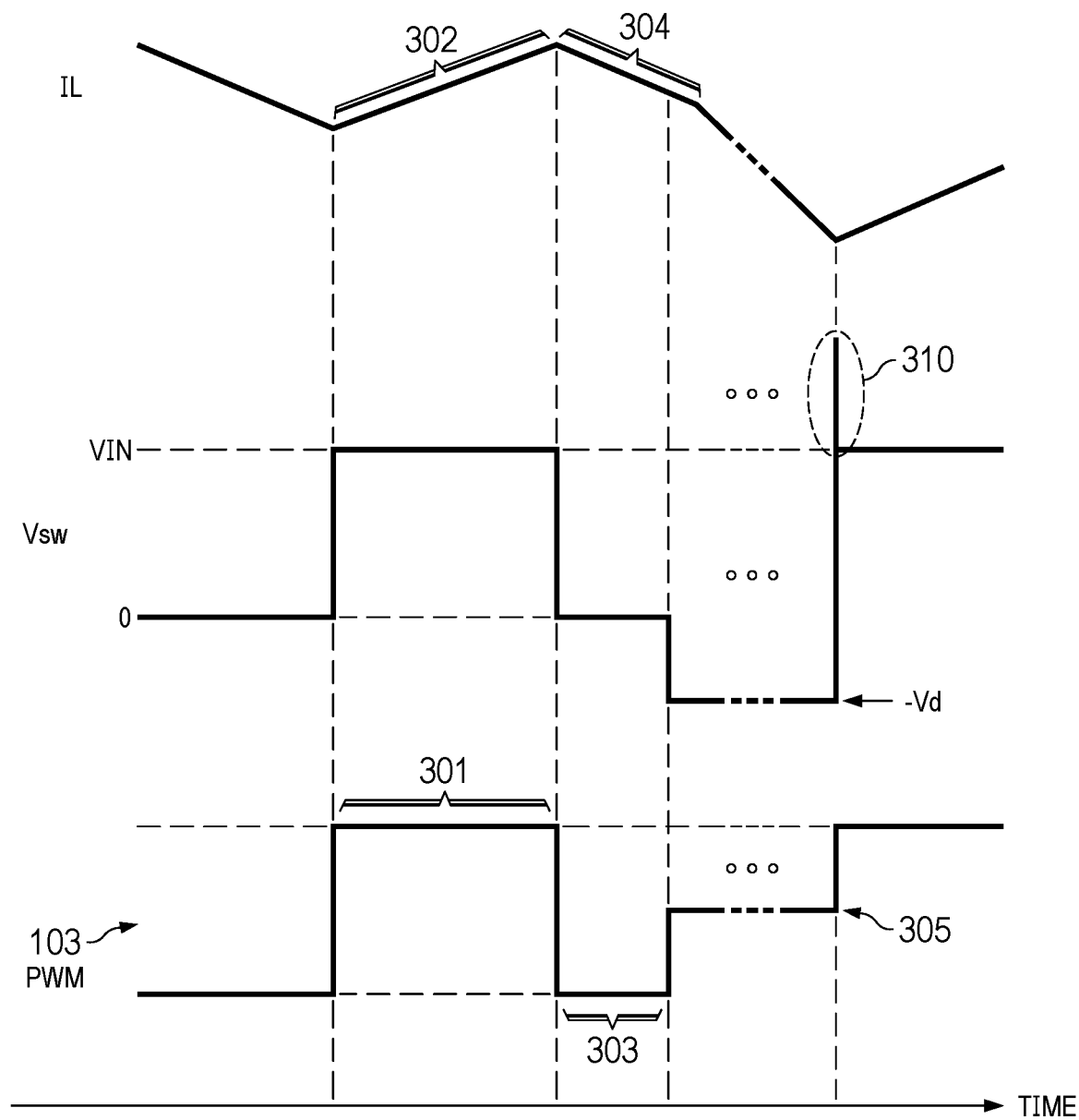
FIG. 3 are additional waveforms of voltages and currents illustrating the operation of the voltage converter responsive to a change in load condition, in an example.

FIG. 3 includes example waveforms for the inductor current IL, the switch node voltage Vsw, and the PWM signal 103. Responsive to PWM 103 being at the logic high level (301), the HS transistor turns ON thereby pulsing Vsw to approximately VIN. With the HS transistor being ON, current (IL) flows through the HS transistor and to the inductor L1. When the HS transistor is ON, the inductor current IL increases approximately linearly as identified by reference numeral 302. Conversely, when the HS transistor is turned OFF and the LS transistor is turned ON (responsive to the PWM signal 103 being logic low (303), Vsw is pulled low to approximately ground and the inductor current IL decreases approximately linearly as identified by reference numeral 304.

For some applications, the downward slope of IL at 304 (when the HS transistor is OFF and the LS transistor is ON) may not be large enough. For example, the load 120 may be a server computer (or a subcircuit of a server computer) powered by the voltage converter. In a data center, which may have a large number of server computers, for power saving purposes it may be useful to transition a given server computer to a low power mode as quickly as possible. To more rapidly transition the voltage converter 100 to a lower power state, the gate controller 104 may implement a third logic level 305. In this example, the third logic level 305 is between the logic high level 301 and the logic low level 303. The intermediate third logic level 305 indicates that both transistors HS and LS should be OFF. Thus, when the voltage converter 100 detects that the load 120 is entering a low power mode (e.g., an external controlling detecting entry into the low power state and informing the voltage converter 100), after causing the LS transistor to be turned ON, the PWM generator 102 transitions the PWM signal 103 to the intermediate level (305). The gate controller 104 responds to this particular logic level of the PWM signal 103 by turning OFF both transistors (the HS transistor should already be OFF at this point, and the gate controller 106 ensures the HS transistor is not turned back ON).

With the LS transistor OFF, the inductor current can no longer flow through the channel of the LS transistor. Instead, the LS transistor's body diode D2 turns ON, and current IL continues to flow through body diode D2 to the inductor L1. Because the body diode is turned ON, a forward voltage drop occurs across the diode (Vd, FIG. 1) which causes Vsw to become negative (approximately −Vd). While the body diode D2 is ON and current IL flows through it, charge builds up within the body diode. This charge is referred to as the reverse recovery charge. Then, upon the load 120 transitioning back from the lower load condition to the higher load condition, as indicated at 210 in FIG. 2), the PWM generator 102 again generates the PWM signal to cause the HS and LS transistors to reciprocally turn ON and OFF.

However, with the reverse recovery charge still present on the body diode D2, the first time the HS transistor turns ON (211) to start the higher load condition, the body diode D2 discharges its reverse recovery charge as a relatively large current that produces a ringing voltage 310 on Vsw (ringing voltage 310 appears a voltage spike due to the compressed time scale in FIG. 3). Although the ringing may be short-lived, the maximum voltage of the ringing Vsw voltage may exceed the safe operating value of the drain-to-source voltage (Vds) of the LS transistor. Consequently, the switch node ringing may damage the LS transistor.

The embodiments described herein are directed to protecting the LS transistor from potentially harmful switch node voltage ringing due to the rapid discharge of the LS transistor's body diode's reverse recovery charge.

Figure 4:
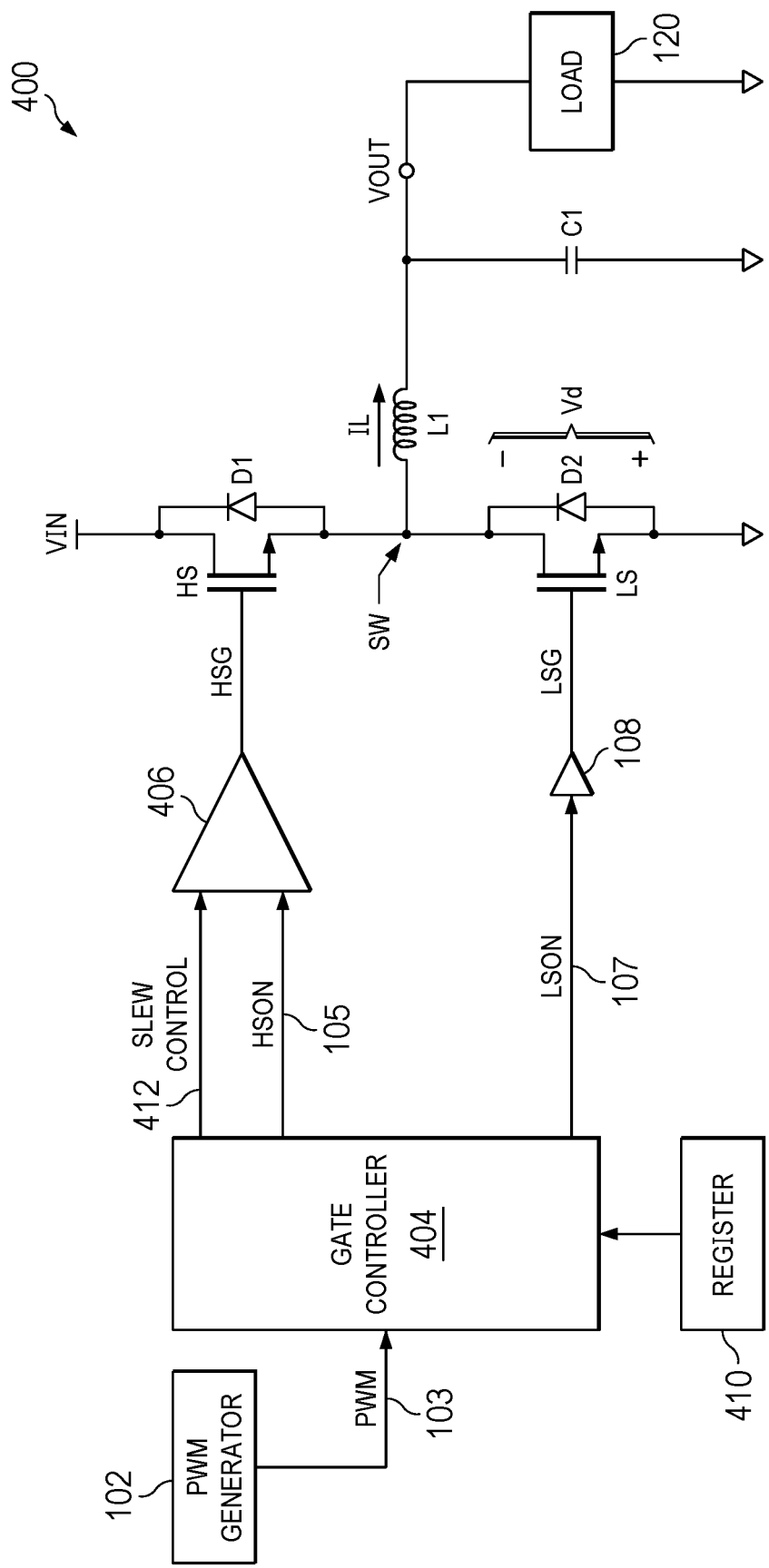
FIG. 4 is a schematic of a voltage converter having a multi-drive strength gate driver, in another example embodiment.

FIG. 4 is a schematic of a voltage converter 400 in accordance with an embodiment. In this example, voltage converter 400 decreases the turn-ON speed of the HS transistor for the first switching cycle after the load changes from a lower load condition to a higher load condition. By decreasing the turn-ON speed of the HS transistor, the voltage on SW (Vsw) rises more gradually than if the turn-on speed of the transistor was higher. As a result, the current resulting from the discharge of the LS transistor's body diode D2 rises more gradually and SW thereby experiences a lower magnitude voltage ringing.

The voltage converter 400 includes the HS and LS transistors, the PWM generator 102, a gate controller 404, driver 108, a multi-drive strength driver 404 for the HS transistor, a register 410, inductor L1, and capacitor C1. The HS and LS transistors shown in FIG. 4 are FETs but can be implemented as other types of transistors (e.g., bipolar junction transistors). The term gate controller 404 is a general term which refers to a circuit that controls the signal applied to the control input of a transistor, whether the control input is a gate in the case of a FET or a base in the case of a bipolar junction transistor. In general, the gate controller 404 may also be referred to as a transistor input controller.

The components are mostly connected the same as described above. The gate controller 404 receives the PWM signal 103 from the PWM generator 102 and generates the HSON signal 105 and the LSON signal 107 as described above. The gate controller 404 also has an output over which the gate controller 404 generates a slew control signal 412. The gate controller 404 asserts the slew control signal 412 to a first logic state (e.g., logic high) to cause the multi-drive strength driver 406 to produce a first drive strength to turn ON the HS transistor. The gate controller 404 deasserts the slew control signal 412 to a second logic state (e.g., logic low) to cause the multi-drive strength driver 406 to produce a second drive strength to turn ON the HS transistor. In one example, the first drive strength is smaller than the second drive strength. To cause the HS transistor to turn on slower, the gate controller 404 asserts the slew control signal 412 to the first logic state. To cause the HS transistor to turn on faster, the gate controller 404 deasserts the slew control signal 412 to the second logic state. In one example, upon the load transitioning from the lower load condition to the higher load condition, the gate controller 404 asserts the slew control signal 412 to the first logic state just for the first switching cycle of the HS transistor. By turning on the HS transistor more slowly just for the first switching cycle, LS transistor's body diode is able to discharge its reverse recovery charge more slowly thereby resulting in a lower magnitude ringing on SW compared to what would have been the case had the HS transistor turned on more rapidly. Then, for the immediately next (and subsequent) switching cycle of the HS transistor, the gate controller 404 deasserts the slew control signal 412 to cause the multi-drive strength driver 406 to turn ON the HS transistor more rapidly.

Register 410 is a programmable register (e.g., through a serial bus such as the Inter-Integrated Circuit (I2C) bus) into which a value can be stored to enable or disable the slew rate control capability of the voltage converter 400. For example, if it is desired for a given application that slew rate control is not needed, a first value can be programmed into register 410 to disable the gate controller 404 from asserting the slew control signal 412. However, if it is desired for a given application (e.g., a server computer in a data center, as described above) that slew rate control is useful, a second value can be programmed into register 410 to enable the gate controller 404 to assert the slew control signal 412 as described above.

In the example of FIG. 4, at least some of the components of the voltage converter 400 may be fabricated in the form of an integrated circuit (IC). For example, the PWM generator 102, the gate controller 404, the register 410, and drivers 108 and 406 may be fabricated on one IC. The HS and LS transistors may be fabricated on the same IC or provided separately (e.g., on a circuit board on which the IC containing the other components is mounted).

Figure 5:
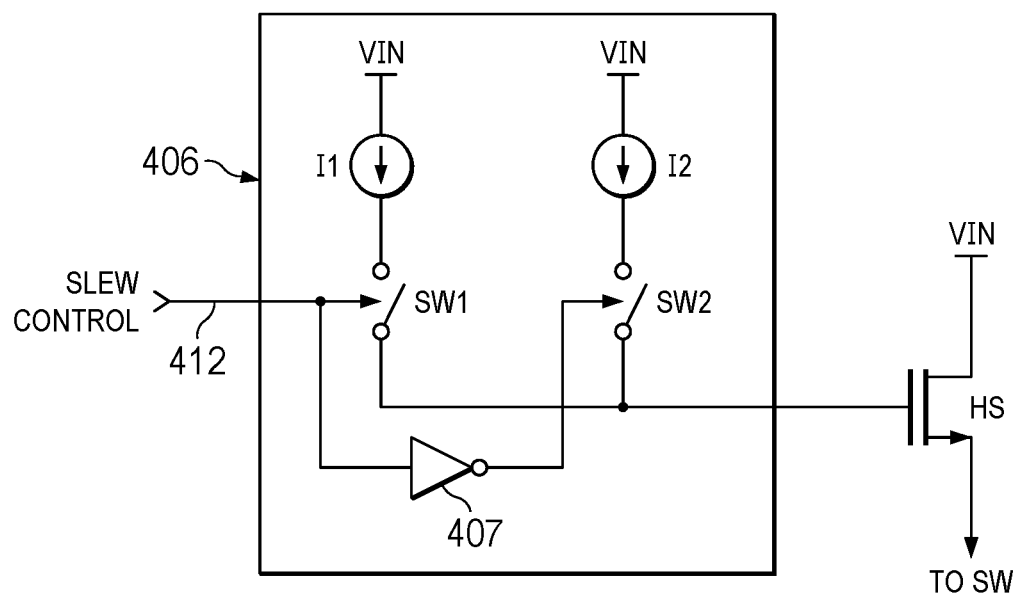
FIG. 5 is a schematic of an example implementation of the multi-drive strength gate driver.

FIG. 5 is a schematic of an example implementation of the multi-drive strength driver 406. I this example, the multi-drive strength driver 406 includes a first current source I1 and a second current source I2. A switch SW1 is coupled between current source I1 and the gate of the HS transistor. A switch SW2 is coupled between the current source I2 and the gate of the HS transistor. The slew control signal controls the ON (closed) or OFF (open) state of switches SW1 and SW2. In one example, a logic high level of the slew control signal 412 causes switch SW1 to close and, via inverter 407, causes switch SW2 to open. The current from whichever current source's switch is closed is provided to the gate of the HS transistor to charge the gate and turn ON the transistor. The turn-ON time of the HS transistor is, at least in part, a function of the magnitude of the gate current from the activated current source. The magnitude of the current produced by current source I1 may be smaller than the magnitude of the current produced by current source I2. A logic low level of the slew control signal 412 causes switch SW1 to open and switch SW2 to close, thereby providing a larger drive current to the gate of the HS transistor. In another example, a slower turn-ON time for the HS transistor is achieved by causing one of the switches SW1 or SW2 to close, and a faster turn-ON time is achieved by causing both of the switches to close.

Figure 6:
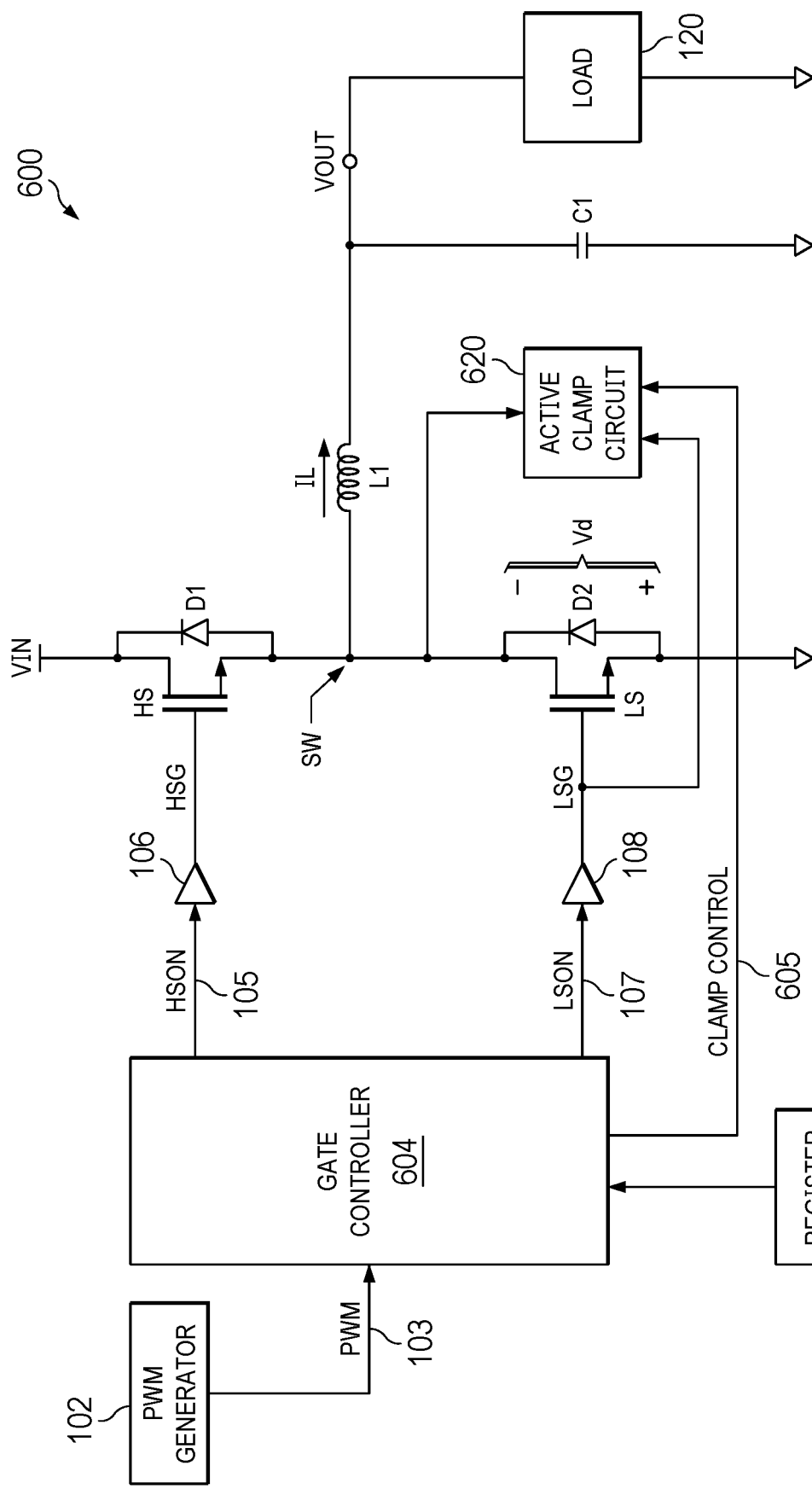
FIG. 6 is a schematic of a voltage converter having an active clamp circuit, in another example embodiment.

FIG. 6 a schematic of a voltage converter 600 in accordance with an embodiment. The voltage converter 600 includes the HS and LS transistors, the PWM generator 102, a gate controller 604, drivers 106 and 108, a register 610, inductor L1, and capacitor C1. The components are mostly connected the same as described above. The gate controller 604 receives the PWM signal 103 from the PWM generator 102 and generates the HSON signal 105 and the LSON signal 107 as described above. In this example, voltage converter 600 includes an active clamp circuit 620 coupled to the LS transistor. The active clamp circuit 620 prevents the LS transistor's Vds from exceeding a particular voltage (e.g., a voltage above which the LS transistor might otherwise be damaged. The otherwise damaging voltage may result from ringing on SW as described above. The particular voltage includes a design margin relative to the maximum possible safe Vds for the LS transistor.

The active clamp circuit 620 is enabled by a clamp control signal 605 generated by the gate controller 604 for the first switching cycle upon transitioning from the lower load condition to the higher load condition. In one example, the gate controller 604 asserts the clamp control signal 605 (e.g., to a logic high level) when the LS transistor is OFF. The switch node voltage ringing that could damage the LS transistor may occur when the HS transistor is turned ON (and the LS transistor is OFF) during the first switching cycle. The LS transistor's body diode D2 may discharge its reverse recovery charge thereby causing ringing on the switch node and thus on the drain of the LS transistor. When activated, the active clamp circuit 620 reduces the magnitude of the ringing on the drain of the LS transistor.

In the example of FIG. 6, at least some of the components of the voltage converter 600 may be fabricated in the form of an IC. For example, the PWM generator 102, the gate controller 604, the register 610, active clamp circuit 620, and drivers 106 and 108 may be fabricated on one IC. The HS and LS transistors may be fabricated on the same IC or provided separately.

Figure 7:
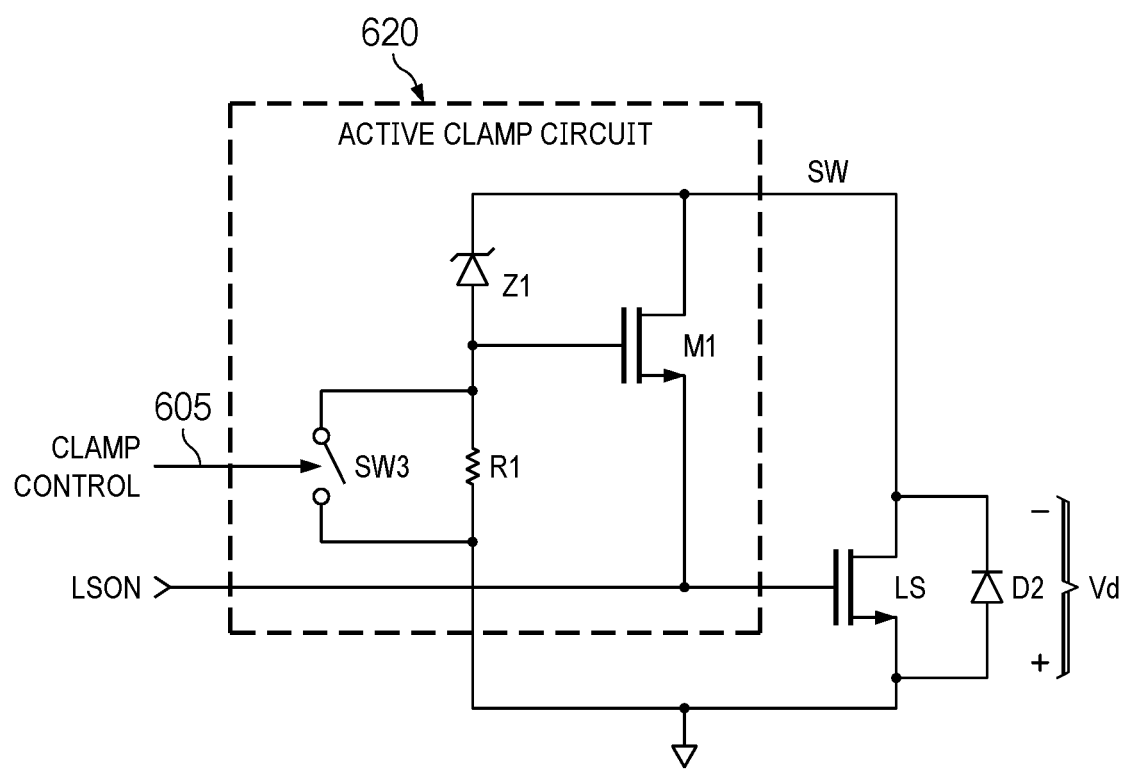
FIG. 7 is a schematic of an example implementation of the active clamp circuit.

FIG. 7 is a schematic of an example implementation of the active clamp circuit 620. The active clamp circuit 620 includes a Zener diode Z1 (or other suitable of diode), a resistor R1, a transistor M1, and a switch SW3. The cathode of Zener diode Z1 is coupled to the switch node SW and to the drain of the LS transistor. The transistor M1 is an NFET in this example. The drain of transistor M1 also is coupled to the switch node SW and to the drain of the LS transistor. The anode of the Zener diode Z1 is coupled to the gate of transistor M1. Resistor R1 is coupled between the anode of Zener diode Z1 and ground. Switch SW3 is coupled across resistor R1. Switch SW3 has a control input that is controlled by the clamp control signal 605. In one example, a assertion (e.g., logic high) of clamp control signal 605 causes switch SW3 to open, and a deassertion (e.g., logic low) of clamp control signal 605 causes switch SW3 to close.

To enable the clamping capability of the active clamp circuit 620, the clamp control signal 605 is asserted, which causes switch SW3 to open. In this state, as the ringing occurs on SW, if Vsw becomes large enough (e.g., exceeds the Zener diode's reverse breakdown voltage), the Zener diode Z1 will turn ON and current will flow through the Zener diode and resistor R1 to ground. As current flows through resistor R1, a voltage is generated across resistor R1 and thus to the gate of transistor M1. Upon the gate-to-source voltage (Vgs) of transistor M1 reaching the threshold voltage of transistor M1, transistor M1 turns ON thereby pulling up the gate voltage on the LS transistor towards Vsw. When the Vgs of the LS transistor reaches its threshold voltage, the LS transistor turns ON. When the LS transistor is ON, the voltage on its drain is pulled down towards ground thereby preventing a harmful Vds voltage from damaging the LS transistor.

When the clamping capability of the active clamp circuit 620 is not needed, the gate controller 604 deasserts the clamp control signal 605. The deassertion of the clamp control signal 605 causes switch SW3 to close. With resistor R1 short-circuited by switch SW3, the gate voltage on transistor M1 is sufficiently low to prevent transistor M1 from turning ON.

Register 610 is a programmable register into which a value can be stored to enable or disable the active clamp circuit 620. Some applications may not benefit from the clamping capability, and a value can be written to register 610 to cause the gate controller 604 from ever asserting the clamp control signal 605. Other applications, however, may benefit from the clamping capability, and another value can be written to register 610 to cause the gate controller 604 to assert the clamp control signal 605 for the first HS transistor switching cycle following a transition from a lower load condition to a higher load condition, as described above.

Figure 8:
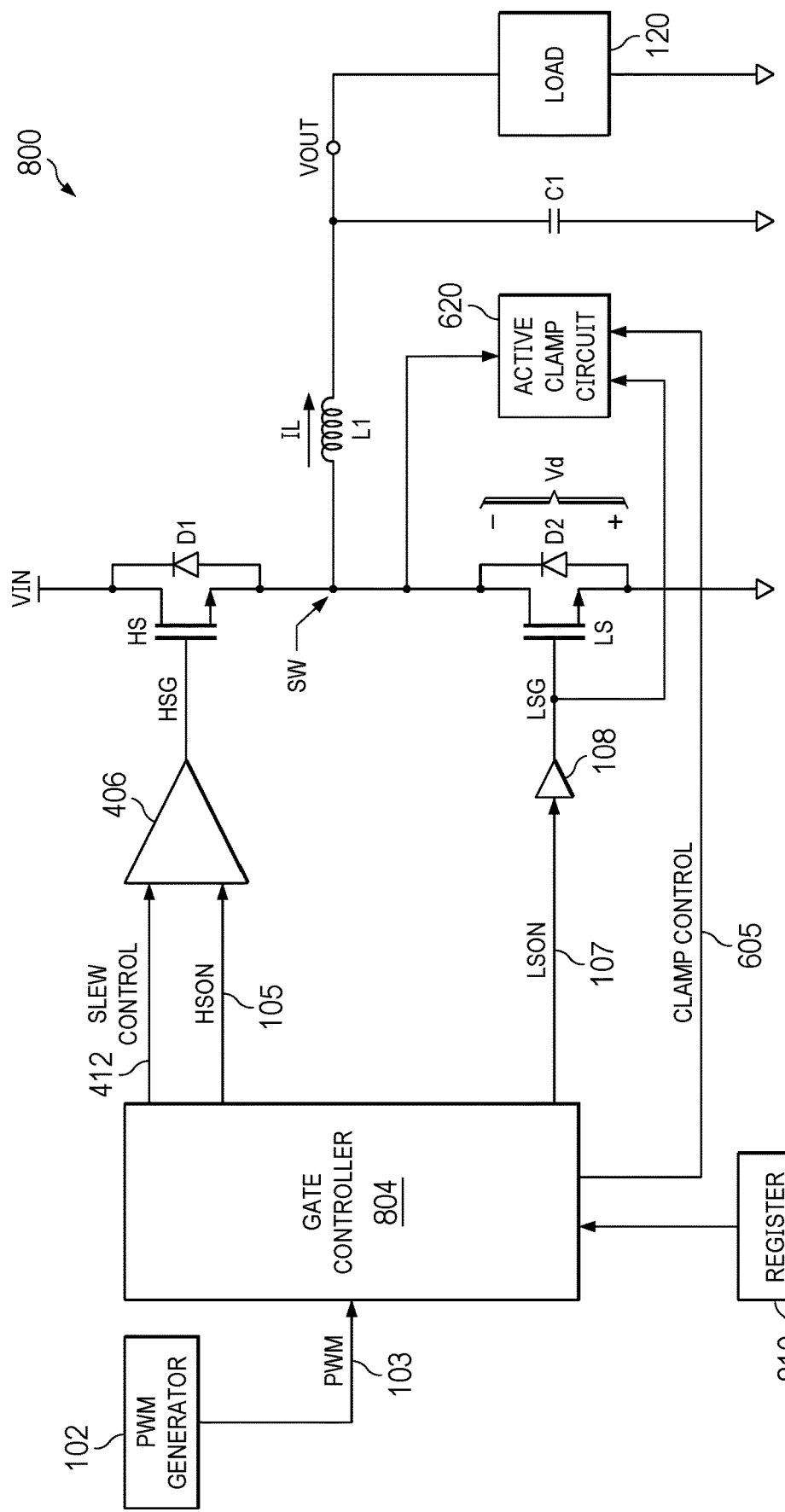
FIG. 8 is a schematic of a voltage converter having both a multi-drive strength gate driver and an active clamp circuit, in an example embodiment.

FIG. 8 is a schematic of voltage converter 800 which combines both the slew rate control and the active clamping capability described above. The voltage converter 800 includes the HS and LS transistors, the PWM generator 102, a gate controller 804, the multi-drive strength driver 406, the driver 108, a register 810, inductor L1, and capacitor C1. The components are mostly connected the same as described above. The gate controller 804 receives the PWM signal 103 from the PWM generator 102 and generates the HSON signal 105 and the LSON signal 107 as described above. In this example, voltage converter 800 includes both the active clamp circuit 620 coupled to the LS transistor and the multi-drive strength driver 406. The gate controller 804 asserts both the slew control signal 412 to the multi-drive strength driver 406 and the clamp control signal 605 to the active clamp circuit 620. The multi-drive strength 406 and the active clamp circuit 620 function as described above. Register 810 is a programmable register into which values can be stored to individually enable or disable the slew control and the clamping control capabilities.

In the example of FIG. 8, at least some of the components of the voltage converter 800 may be fabricated in the form of an IC. For example, the PWM generator 102, the gate controller 804, the register 810, active clamp circuit 620, multi-drive strength driver 406, and driver 108 may be fabricated on one IC. The HS and LS transistors may be fabricated on the same IC or provided separately.

Figure 9:
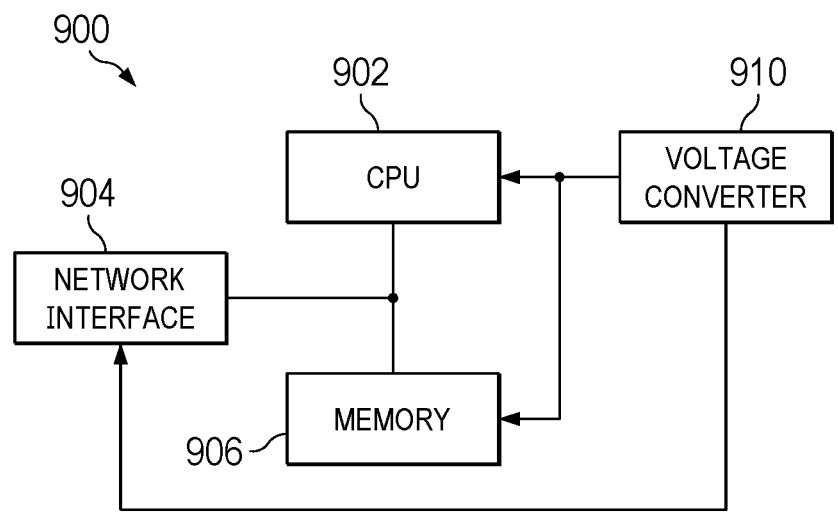
FIG. 9 is a block diagram of a system in which any of the voltage converters described herein can be used.

FIG. 9 is a block diagram of a system 900 in which any of the voltage converters described herein can be used. The system 900 includes a central processing unit (CPU) 902, a network interface 904, a memory device 906, and a voltage converter 910. The voltage converter 910 provides power for the CPU 902, the network interface 904, and the memory device 906. The voltage converter 910 may be implemented as any of the voltage converters described herein.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input is the gate, and the current terminals are the drain and source. In the context of a BJT, the control input is the base, and the current terminals are the collector and emitter.

References herein to a FET being "on" means that the conduction channel of the FET is present and drain current may flow through the FET. References herein to a FET being "off" means that the conduction channel is not present and drain current does not flow through the FET. An "off" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

References to a signal being "asserted" refers to a signal being forced to a particular logic state, and the signal being "deasserted" refers to the signal being forced to another logic state.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described embodiments, and other embodiments are possible, within the scope of the claims.

What is claimed is:

1. A device comprising:
    a controller having a first output, a second output, and a third output, the controller configured to:
        set a slew control signal at the third output to a first value for a first switching cycle after detecting a change in a load condition; and
        set the slew control signal at the third output to a second value for a second switching cycle after detecting the change in the load condition;
    a first transistor having a control terminal and a current terminal;
    a second transistor having a current terminal and a control terminal, the current terminal of the second transistor coupled to the current terminal of the first transistor, and the control terminal of the second transistor coupled to the second output of the controller; and
    a driver having a first input, a second input, and a driver output, the first input of the driver coupled to the third output of the controller, the second input of the driver coupled to the second output of the controller, the driver output coupled to the control terminal of the first transistor, and the driver configured to:
        provide a first current at the driver output responsive to receiving a driver control signal at the second input of the driver and the first value of the slew control signal at the first input of the driver; and
        provide a second current at the driver output responsive to receiving the driver control signal at the second input of the driver and the second value of the slew control signal at the first input of the driver, in which the second current is larger than the first current.

2. The device of claim 1, wherein the controller is configured to force the slew control signal at the third output to the first value of the slew control signal responsive to a reduction in the load condition.

3. The device of claim 1, wherein the controller is configured to force the slew control signal to the second value of the slew control signal before a switching cycle of the first transistor that immediately follows a next switching cycle of the first transistor.

4. The device of claim 1, wherein the current terminal of the second transistor is a first current terminal, the device further comprising a clamp circuit coupled to the second transistor, the clamp circuit configured to prevent a voltage between the first current terminal of the second transistor and a second current terminal of the second transistor from exceeding a particular voltage.

5. The device of claim 4, wherein:
    the current terminal of the second transistor is a first current terminal;
    the clamp circuit has an input;
    the controller has a fourth output coupled to the input of the clamp circuit;
    the controller is configured to force a clamp control signal to the first value at the fourth output responsive to the change in the load condition; and
    the clamp circuit is configured to prevent the voltage between the first current terminal of the second transistor and a second current terminal of the second transistor from exceeding the particular voltage responsive to receiving the first value of the clamp control signal.

6. The device of claim 4, wherein the clamp circuit comprises:
    a diode coupled to the current terminal of the second transistor;
    a resistor coupled between the diode and the control terminal of the second transistor; and
    a third transistor having a control terminal, a first current terminal, and a second current terminal, the control terminal of the third transistor coupled to the diode and to the resistor, the first current terminal of the third transistor coupled to the current terminal of the second transistor, and the second current terminal of the third transistor coupled to the control terminal of the second transistor.

7. The device of claim 1, further comprising:
    a diode coupled to the current terminal of the second transistor;
    a resistor coupled between the diode and the control terminal of the second transistor; and
    a third transistor having a control terminal, a first current terminal, and a second current terminal, the control terminal of the third transistor coupled to the diode and the resistor, the first current terminal of the third transistor coupled to the current terminal of the second transistor, and the second current terminal of the third transistor coupled to the control terminal of the second transistor.

8. The device of claim 7, further comprising a switch coupled across the resistor, the switch having a control input coupled to the controller.

9. A system comprising:
    a controller having a first output, a second output, and a third output;
    a first transistor having a control terminal and a current terminal, the control terminal of the first transistor coupled to the first output of the controller;
    a second transistor having a control terminal, a first current terminal, and a second current terminal, the first current terminal of the second transistor coupled to the current terminal of the first transistor, and the control terminal of the second transistor coupled to the second output of the controller; and
    a clamp circuit coupled to the second transistor and to the controller, the clamp circuit having an input coupled to the third output of the controller, the clamp circuit configured to prevent, responsive to receiving a signal having a first value at the input, a voltage between the first current terminal of the second transistor and the second current terminal of the second transistor from exceeding a particular voltage.

10. The system of claim 9, wherein the clamp circuit comprises:
   a diode coupled to the first current terminal of the second transistor;
   a resistor coupled between the diode and the control terminal of the second transistor; and
   a third transistor having a control terminal, a first current terminal, and a second current terminal, the control terminal of the third transistor coupled to the diode and the resistor, the first current terminal of the third transistor coupled to the first current terminal of the second transistor, and the second current terminal of the third transistor coupled to the control terminal of the second transistor.

11. The system of claim 10, the clamp circuit further comprising a switch coupled across the resistor, the switch having an input that is coupled to the input of the clamp circuit.

12. The system of claim 11, wherein the switch is configured to open responsive to receiving the first value of the signal.

13. The system of claim 9, wherein the controller is configured to force the signal to a second value before a next switching cycle of the first transistor that immediately follows a switching cycle of the first transistor for which the signal was at the first value.

14. The system of claim 9, wherein the controller has a fourth output, and the controller is configured to activate a slew control signal at the fourth output responsive to a change in a load condition, and the system further comprises:
   a driver coupled between the control terminal of the first transistor and the first output of the controller, the driver having a first drive strength capability and a second drive strength capability, the driver having an input coupled to the fourth output of the controller, the driver configured to activate the first drive strength capability or the second drive strength capability responsive to a logic state of the slew control signal.

15. A device comprising:
   a controller having a first output, a second output, a third output, and a fourth output;
   a first transistor having a control terminal and a current terminal, the control terminal coupled to the first output of the controller;
   a second transistor having a control terminal and a current terminal, the current terminal of the second transistor coupled to the current terminal of the first transistor, and the control terminal of the second transistor coupled to the second output of the controller;
   a driver coupled between the first output of the controller and the control terminal of the first transistor, the driver having an input coupled to the fourth output of the controller; and
   a clamp circuit coupled to the second transistor, the clamp circuit having an input coupled to the third output of the controller.

16. The device of claim 15, wherein the driver is configured to selectively assert a first drive strength capability or a second drive strength capability responsive to a logic state of a slew control signal at the input of the clamp circuit, the first drive strength capability is configured to provide a smaller drive strength to the first transistor than the second drive strength capability, and the driver is configured to select the first drive strength capability responsive to the assertion of the slew control signal.

17. The device of claim 15, wherein, responsive to a change from a higher load condition to a lower load condition, the controller is configured to assert a slew control signal at the fourth output and a clamp control signal on the third output.

18. The device of claim 15, wherein, responsive to a change from a lower load condition to a higher load condition, the controller is configured to deassert a slew control signal at the fourth output and deassert a clamp control signal at the third output.

19. The device of claim 15, wherein, the controller is configured to deassert a slew control signal and deassert a clamp control signal before a switching cycle of the first transistor that immediately follows a switching cycle of the first transistor for which the slew control signal and the clamp control signal was activated.

20. The device of claim 15, wherein the clamp circuit comprises:
   a Zener diode coupled to the current terminal of the second transistor;
   a resistor coupled between the Zener diode and the control terminal of the second transistor; and
   a third transistor having a control terminal, a first current terminal, and a second current terminal, the control terminal of the third transistor coupled to the Zener diode and the resistor, the first current terminal of the third transistor coupled to the current terminal of the second transistor, and the second current terminal of the third transistor coupled to the control terminal of the second transistor.

* * * * *